Dec. 31, 1963 M. McCORKLE 3,115,887
MISSILE ROLL CONTROL VALVE SYSTEM
Filed Feb. 23, 1961 2 Sheets-Sheet 1
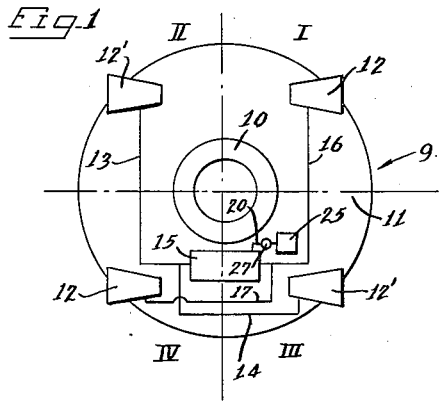
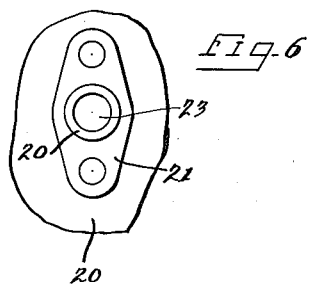
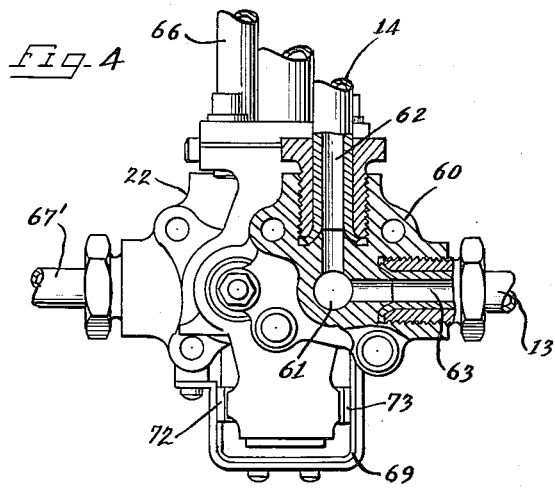
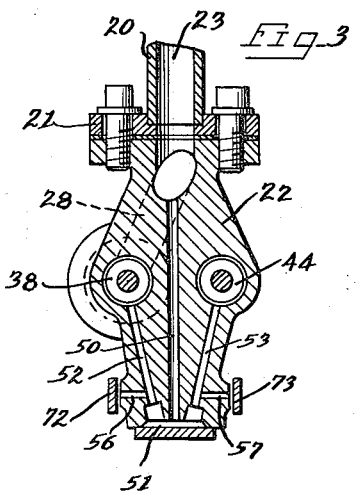
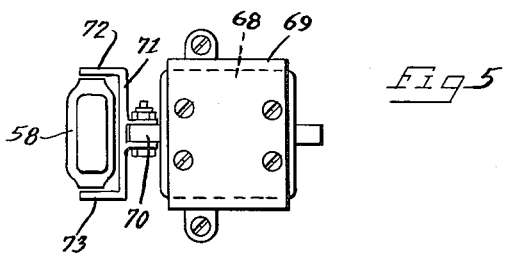
INVENTOR.
Max McCorkle
BY
ATTORNEYS Dec. 31, 1963    M. McCORKLE    3,115,887
MISSILE ROLL CONTROL VALVE SYSTEM
Filed Feb. 23, 1961    2 Sheets-Sheet 2
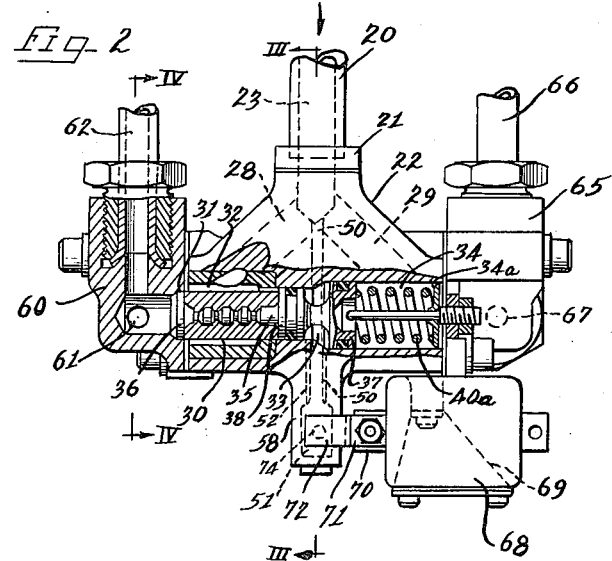
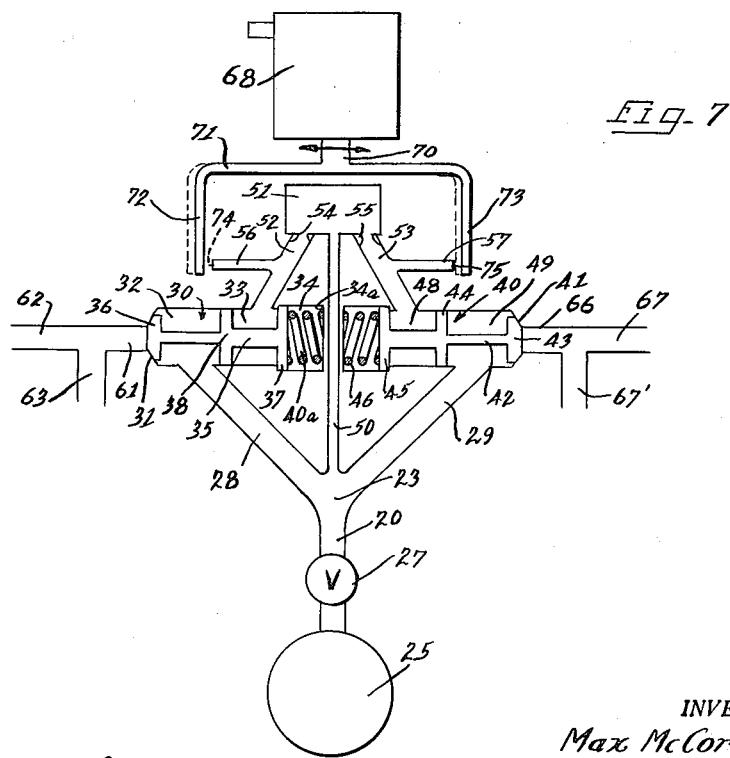
INVENTOR.
Max McCorkle
BY
ATTORNEYS United States Patent Office 3,115,887
Patented Dec. 31, 1963

3,115,887
MISSILE ROLL CONTROL VALVE SYSTEM
Max McCorkle, Willoughby, Ohio, assignor to Thompson Ramo Wooldridge Inc., Cleveland, Ohio, a corporation of Ohio
Filed Feb. 23, 1961, Ser. No. 91,202
4 Claims. (Cl. 137—82)

This invention relates to rockets, missiles and the like and is more particularly directed to improved methods and means for modulating flow of gas to provide only a predetermined quantum or force pulse for controlled operation of roll control nozzles and the like.

Heretofore, difficulty has been encountered in calibrating and synchronizing one or more roll control nozzles employed to prevent undesirable changes in the orientation or attitude of an air or space borne vehicle, such as a nose cone, satellite, rocket and the like.

Roll control nozzles located on the air or space borne vehicle have been employed to control the attitude of the vehicle in the roll planes by expelling gases from the nozzles to counteract the effects of movement in the roll plane caused by undesired external force applications. One of the critical parameters in operation of roll control systems employing jet nozzles is that the gases be expelled from the nozzle only in a predetermined amount sufficient to provide only the correcting force. Control therefore of the quantity of gases supplied to the nozzles has presented design problems not encountered in the art previously. It will be appreciated that if the force applied to correct roll movement is greater than the force to be corrected, the vehicle will be required to apply a force in the opposite direction through a second or plurality of nozzles to compensate for the over correction. If these latter nozzles apply a correcting force greater than required, it will be necessary to actuate similar nozzles to provide a counteracting force and so on. Thus the vehicle will be in a constant state of oscillation.

By employment of the present invention I provide improved roll control valve means which is actuatable to direct flow of gas to one or more reaction nozzles to produce a clockwise rolling moment or to one or more reaction nozzles to produce a counterclockwise rolling moment.

It is therefore an object of the present invention to provide an improved roll control system for air and space borne vehicles.

It is another object of the present invention to provide a roll control system having roll control valve apparatus actuatable to selectively deliver a predetermined quantum of exhaust gases to roll control nozzles for producing either clockwise or counterclockwise rolling moment.

It is another object of the present invention to provide an improved roll control valve mechanism for selectively supplying a predetermined quantity of gases to roll control nozzles for producing either clockwise or counterclockwise rolling moment.

Another object of the present invention is to provide improved valve mechanisms for roll control of an air or space borne vehicle incorporating the feature of supplying intermittently and selectively a predetermined quantity of gases to roll control nozzles for producing either clockwise or counterclockwise rolling moment to an air or space borne vehicle.

It is a further object of the present invention to provide improved methods of supplying a predetermined quantity of gases to roll control nozzles for selectively producing either clockwise or counterclockwise rolling moment.

These and other objects, features and advantages of the present invention will become apparent from a careful consideration of the following detailed description, when considered in conjunction with the accompanying drawings, illustrating a preferred embodiment of the present invention, and wherein like reference numerals and characters refer to like and corresponding parts throughout the several views.

On the drawings:

FIGURE 1 is a generally schematic view in elevation of an air or space borne vehicle including roll control nozzles of the present invention.

FIGURE 2 is an enlarged view in partial section of roll control valve means constructed in accordance with the present invention.

FIGURE 3 is a view taken along lines III—III of FIGURE 2.

FIGURE 4 is a view taken along lines IV—IV of FIGURE 2.

FIGURE 5 is a fragmentary bottom view of the valve means of FIGURE 2.

FIGURE 6 is a fragmentary top view in elevation of the valve means of FIGURE 2.

FIGURE 7 is a schematic view illustrating the operation of the valve means of FIGURE 2.

As shown on the drawings:

Briefly stated, the present invention relates primarily to roll control of an air or space borne vehicle by employing gas discharge nozzles of the De Laval type positioned on the vehicle for expelling a predetermined quantity of gases to correct and counteract the effect of rolling moment induced in the vehicle from undesired forces.

Referring to FIGURE 1, there is shown an air or space borne vehicle, generally designated by the numeral 9, which includes the aft or rearward gas discharge nozzle 10 which communicates with a reaction chamber (not shown) for discharge of the exhaust gases therefrom which propel the vehicle 9. Mounted on the rear end or wall 11 of the vehicle 9 may be a plurality of jet nozzles 12 and 12'. The nozzles 12' as viewed in the II and III quadrants in FIGURE 1 are employed to control or counteract rolling moment of the vehicle 9 in the counter-clockwise roll plane as viewed in FIGURE 1 whereas the nozzles 12 shown in the I and IV quadrants in FIGURE 1 are employed for controlling or counteracting rolling moment of the vehicle in the roll plane clockwise as viewed in FIGURE 1.

It will be appreciated that only a pair of opposed nozzles 12 as shown in the first and third quadrants as appears in FIGURE 1 or a pair of nozzles 12' appearing in the second and fourth quadrants of FIGURE 1 may be employed for roll control or more than four nozzles may be employed for this purpose.

Gases may be fed to the nozzles in the second and third quadrant through a pair of conduits 13 and 14 from a roll control valve device, generally indicated by the numeral 15, mounted on the rear wall 11 of the vehicle, and, similarly, the roll control nozzles 12 shown in the first and fourth quadrants in FIGURE 1 may be supplied gases through conduits 16 and 17 from a roll control valve device, generally indicated by the numeral 15 mounted on the rear wall 11 of the vehicle.

Referring to FIGURE 2 illustrating a preferred roll control valve device, there is shown an inlet conduit 20 secured as by a fitting 21 to a housing 22 which is passaged as at 23, shown by the dotted lines, and the conduit 20 may be connected at its other end to a gas generator 25 for supplying gases to the passage 23. An appropriate control valve 27 may be connected in conduit 20 for controlling flow of the gases from the generator 25 (FIGURE 1).

Housing passage 23 communicates with a pair of passages 28 and 29 defining a Y in cross section. Passage 28 communicates with a chamber 30 formed in the housing 22 and having an outlet 31. The chamber 30 is separated into three compartments 32, 33 and 34 (FIGURE 7) by a valve 35. The valve 35 carries a tapered head at 36 adjacent the outlet 31 of the chamber 30, annular end plate 37 at its end opposite the valve head 36 and an intermediate piston head 38 which cooperates with the valve head 36 and end plate 37 to define the pressurizable compartments 32, 33 and 34. The piston head 38 is spaced from the valve head 36 to permit flow from the branch passage 28 into the chamber 32. Resilient means, such as spring 40a, may be positioned in chamber 34 and bottomed against the end wall 34a for urging the end plate 37 and valve 35 to the normally closed position with the tapered valve 36 seated in a complementarily tapered surface of the outlet 31 of the chamber.

Spaced from the chamber 30 and preferably axially aligned therewith is a second chamber 40 having a tapered outlet 41. A valve 42 similar in construction and operation to the valve 35 is positioned in the chamber 40 and includes a valve head 43, divider piston 44 and end plate 45. A spring 46 urges the valve 42 to the normally closed position with the valve head 43 closing outlet 41 of the chamber. The valve plate 45 and piston 44 define a pressurizable compartment 48 whereas the piston head 44 and valve head 43 define a pressurizable compartment 49 communicating with the branch passage 29 (FIGURE 7).

The main passage 20 in the housing communicates with a passage 50 which supplies the pressurizing medium to a collection or accumulator chamber 51 formed in the housing. The chamber 51 communicates with a pair of passages 52 and 53 which supply the fluid to the chambers 33 and 48 respectively. Restrictions 54 and 55 or venturi type orifices may be employed in the inlets to passages 52 and 53. The restrictions or orifices are sized with respect to the flow characteristics of the fluid employed, such as hot gases, and to the desired control pressures in the valve assemblies in chambers 30 and 40.

In the housing 22, the passages 52 and 53 communicate with bleed outlet passages 56 and 57 which discharge from the housing, preferably from an extension 58 of the housing 22 (FIGURE 2) and are preferably axially aligned for purposes hereinafter more fully disclosed.

Thus, the fluid medium, such as a hot gas, flows through the branch passages 28 and 29 into chambers 32 and 49 and cooperate with the springs 40a and 46 to maintain the valve heads 36 and 43 in the normally closed position. Similarly, the fluid flowing through passage 50 and from the accumulator 51 through branch passages 52 and 53 cooperate to maintain the valves in the closed positions.

The outlet 31 of chamber 30 is connected through an appropriate fitting to a passaged housing 60 and the passage 61 (FIGURE 4) of the housing 60 communicates through a pair of passages 62 and 63 with the conduits 13 and 14 for supplying the exhaust gases to the nozzles 12' shown in FIGURE 1. Similarly, the outlet 41 of chamber 40 communicates with a passaged housing 65 (FIGURE 2) which communicates with a pair of passages 66 and 67 which are connected to an appropriate fitting to conduits 16 and 17 for supplying the fluid, such as hot gases, to the nozzles 12 and 12 in the first and fourth quadrants of FIGURE 1.

Signal responsive means for selectively controlling opening of the valves 35 and 42 may include a conventional torque motor 68 which may be mounted on a bracket 69 secured to the housing 22. The torque motor 68 may be operatively responsive to a signal received from a remote source, such as the auto pilot system (not shown) of the vehicle with which employed for moving the reciprocable shaft 70 of the torque motor in the directions shown by the arrows in FIGURE 7.

The reciprocable torque motor shaft 70 carries a U-shaped member 71 having opposed flapper valve ends 72 and 73 thereof positioned adjacent the outlets 74 and 75 of the bleed passages 56 and 57.

Thus, movement of the flapper end 72 to the left to the position shown by the dotted lines in FIGURE 7 will move the flapper end 73 proportionately closer to the outlet 75 of the bleed passage 57. Conversely, movement of the torque motor shaft 70 to the right will move flapper valve end 72 closer to the bleed outlet 74 and the flapper member 73 a proportionate distance away from the bleed outlet 75.

As the distance between the flapper end 73 and its corresponding outlet 75 is reduced, a pressure build up occurs in passage 53 and consequently in chamber 48. The pressure forces in chamber 48 exceed the preload of spring 46 moving the valve 42 to the left as viewed in FIGURE 7 and opening the outlet 41 to permit flow of the pressure medium from chamber 49 into the passage 66, branch passages 67 and 67' and thus through conduits 16 and 17 to the roll control nozzles 12 shown in quadrants 1 and 4 of FIGURE 1. It will be appreciated that the decrease in pressure in bleed passage 56, passage 52 and chamber 33 will not cause movement of the valve 35 to the open position.

Movement of the flapper valve to the right as viewed in FIGURE 7 will cause opening of the valve 35 and flow of the pressurizing medium through chamber 32, the passages and housing 60 and through conduits 13 and 14 to the roll control nozzle 12' shown in quadrants 2 and 3 of FIGURE 1. It will be appreciated that the amount of thrust or force provided by the pair of activated roll control nozzles for clockwise or counterclockwise roll control will be equal and that a single valve control device, i.e., U-shaped member 71 and torque motor 68, selectively control operation of either valve 35 or 42 without actuating the other valve.

The torque motor 68 may then be actuated to return the shaft 70 and U-shaped member 71 to the equilibrium position wherein both flapper ends 72 and 73 are located equidistant from the corresponding outlets 74 and 75 respectively thereby decreasing pressure in either chamber 32 or 48 and thereby the force applied on the valve 35 or 42 below the preload level of either springs 40a or 46 which then return the valve 35 or 42 to the closed position terminating flow to the activated jet nozzles 12 or 12'.

It will be appreciated that I employ a single valve control device for selectively actuating the flow control valves to nozzles controlling the rolling moment of the vehicle in either a clockwise or counterclockwise direction without affecting operation of the flow control valve means controlling flow to nozzles controlling rolling moment of the vehicle in the opposite direction and wherein both clockwise and counterclockwise control nozzles and valve devices are supplied from a common source.

Although various minor modifications of the present invention might be apparent to those skilled in the art, it is to be understood that I wish to embody within the scope of the patent warranted hereon all such embodiments as reasonably and properly come within the scope of my contribution to the art.

I claim as my invention:

1. A device adapted to selectively supply a predetermined quantum of a pressurized medium to a pair of nozzles for controlling rolling moment of air and space borne vehicles comprising: a valve housing having a pair of valve chambers, each of said chambers being separated into first and second pressurizable compartments by a valve, an outlet in each of said first compartments for supplying a pressurized medium to a nozzle, main passage means formed in the valve housing connecting the first compartments of each of said valve chambers to a source of pressurized medium to deliver the pressurized medium to said first compartments, branch passage means formed in the housing for communicating the main passage means with the second compartments of each valve chamber, bleed passages formed in the housing communicating with the branch passages, and signal responsive means for varying pressure conditions in the bleed passages to thereby cause selective opening of the valves to permit flow of the pressurized medium from the first compartments to the associated nozzle.

2. A device adapted to selectively supply a predetermined quantum of a pressurized medium to a pair of nozzles for controlling rolling moment of air and space borne vehicles comprising: a valve housing having a pair of valve chambers, an outlet for each of the chambers, a valve in each chamber carrying a head normally closing the outlet, a member carried by each valve separating each chamber into a pair of first and second pressurizable compartments, main passages in the valve housing connecting a source of a pressurized medium to the first compartment of each valve chamber to deliver the pressurized medium to said first compartments, branch passages in the housing for communicating the main passages with the second compartment of each valve chamber to maintain the valve in the closed position when pressure conditions in the first and second compartments of each valve chamber are in equilibrium, bleed outlets in the housing communicating with the branch passages, and common signal responsive means for varying pressure conditions in said bleed passages to thereby cause selective and separate opening of the valve chambers to permit flow through the outlets.

3. A device adapted to selectively supply a predetermined quantum of a pressurized medium to a pair of nozzles for controlling rolling moment of air and space borne vehicles comprising: a valve housing having a pair of spaced valve chambers, an outlet for each chamber adapted for communication with a nozzle, a valve in each chamber carrying a head normally closing the outlet, a member carried by each valve separating each chamber into a pair of first and second pressurizable compartments, means normally urging the valves to a position closing the outlets of the chambers, a pair of main passages in the valve housing connecting a source of pressurized medium to each of the first compartments of each valve chamber to deliver the pressurized medium to said first compartments, a pair of branch passages in the housing for communicating each of the main passages with the second compartments of each valve chamber, bleed outlets in the housing communicating with the branch passages, and means for selectively controlling flow through the bleed outlets to vary pressure conditions in the first and second compartments of each valve chamber and thereby selectively open the chambers to permit flow to the associated nozzle.

4. A device adapted to selectively supply a predetermined quantum of a pressurized medium to a pair of nozzles for controlling rolling moment of air and space borne vehicles comprising: a valve housing having a pair of spaced first and second valve chambers, an outlet for each valve chamber, a valve member in each chamber carrying a valve head for closing the outlet of each chamber, a flange carried by each valve member at its end remote from the head, resilient means acting on the flange urging each valve member to the closed position, a piston carried by each valve in each chamber for separating the chamber into first and second pressurizable compartments, a main passage formed in the housing for supply of a pressurized medium, a branch passage communicating the main passage with the first compartment of the first chamber, a branch passage communicating the first compartment of the second valve chamber with the main passage, a branch passage communicating the main passage with an accumulator chamber, a branch passage communicating the accumulator chamber with the second compartment of the first valve chambers, a branch passage communicating the accumulator chamber with the second compartment of the second valve chamber, restrictions in the accumulator branch passages, a pair of bleed outlets formed in the housing, one of said bleed outlets communicating with one of said accumulator branch passages and the other bleed outlet communicating the other accumulator branch passage, a torque motor, a reciprocable shaft carried by the torque motor and a U-shaped member carried by the torque motor having one arm positioned adjacent one of said bleed outlets and the other arm positioned adjacent the other bleed outlet, whereby reciprocable movement of the reciprocable U-shaped member in the opposite direction will increase the pressure in the second compartment of the second valve chamber and cause opening of the valve chamber.

References Cited in the file of this patent

UNITED STATES PATENTS

| 2,700,986 | Gunn | Feb. 1, 1955 |
| 2,952,246 | Collins | Sept. 13, 1960 |
| 2,973,162 | Haeussermann | Feb. 28, 1961 |
| 2,974,594 | Boehm | Mar. 14, 1961 |
| 2,982,306 | Fitzgibbon | May 2, 1961 |

FOREIGN PATENTS

| 879,835 | France | Mar. 5, 1943 |

OTHER REFERENCES

Control Engineering, page 151, vol. 7, No. 1, January 1960.